(12) United States Patent
Nakata (10) Patent No.: US 7,912,371 B2
(45) Date of Patent: Mar. 22, 2011

(54) OPTICAL TRANSMISSION DEVICE, OPTICAL TRANSMISSION METHOD, AND COMPUTER PRODUCT

(75) Inventor: Nobuki Nakata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 704 days.

(21) Appl. No.: 11/498,202

(22) Filed: Aug. 3, 2006

(65) Prior Publication Data

US 2007/0223922 A1 Sep. 27, 2007

(30) Foreign Application Priority Data

Mar. 24, 2006 (JP) ................................. 2006-083938

(51) Int. Cl.
 *H04J 14/00* (2006.01)
(52) U.S. Cl. ........................................... 398/52; 398/53
(58) Field of Classification Search ............... 398/52–54
 See application file for complete search history.

(56) References Cited

U.S. PATENT DOCUMENTS

| | | | | |
|---|---|---|---|---|
| 6,865,180 | B1 * | 3/2005 | Waespe | 370/360 |
| 6,934,471 | B1 * | 8/2005 | Carvey et al. | 398/45 |
| 6,956,874 | B1 * | 10/2005 | Moore et al. | 370/535 |
| 6,996,342 | B2 * | 2/2006 | Park et al. | 398/48 |
| 7,352,758 | B2 * | 4/2008 | Makam et al. | 370/405 |
| 2003/0198471 | A1 * | 10/2003 | Ovadia | 398/47 |
| 2004/0073650 | A1 | 4/2004 | Nakamura | 709/223 |
| 2005/0078959 | A1 * | 4/2005 | Shin et al. | 398/45 |
| 2005/0237927 | A1 * | 10/2005 | Kano et al. | 370/216 |
| 2007/0036554 | A1 * | 2/2007 | Weaver | 398/156 |

FOREIGN PATENT DOCUMENTS

| | | |
|---|---|---|
| JP | 3-195156 | 8/1991 |
| JP | 5-83226 | 4/1993 |
| JP | 2002-51052 | 2/2002 |
| JP | 2002-320247 | 10/2002 |
| JP | 4-112693 | 4/2004 |

OTHER PUBLICATIONS

E. Mannie, D. Papadimitriou; "Generalized Multi-Protocol Label Switching (GMPLS) Extensions for Synchronous Optical Network (SONET) and Synchronous Digital Hierarchy (SDH Control"; pp. 1-20; Dec. 2005.
Japanese Office Action mailed Oct. 12, 2010 in corresponding Japanese Patent Application 2006-083938.

\* cited by examiner

*Primary Examiner* — Nathan M Curs
(74) *Attorney, Agent, or Firm* — Staas & Halsey LLP

(57) ABSTRACT

An optical transmission device includes an input interface unit, a cross-connecting unit, and an output interface unit, and a bandwidth switching control unit, and switches bandwidths allocated to paths in a transmission channel that connects to an adjoining optical transmission device synchronously with the adjoining optical transmission device. When the bandwidths are not continuous in the transmission channel, the bandwidth switching control unit controls the input interface unit, the cross-connecting unit and the output interface unit to rearrange the non-continuous bandwidths into continuous ones.

9 Claims, 11 Drawing Sheets

OPTICAL TRANSMISSION DEVICE, OPTICAL TRANSMISSION METHOD, AND COMPUTER PRODUCT

BACKGROUND OF THE INVENTION

1. Field of the Invention

The present invention relates to a technology for setting bandwidths of optical communication channels in an optical network. More particularly, the present invention relates to a technology for eliminating bandwidth separation occurring in a transmission channel.

2. Description of the Related Art

In large-scale networks such as the ones forming the backbone of the Internet, Metropolitan Area Network (MAN), etc. optical fibers with little loss and broadband have come to be widely used as transmission medium.

As a basic optical transmission technology used in an optical network may be cited Synchronous Optical Network/Synchronous Digital hierarchy (SONET/SDH). The SONET/SDH technology involves hierarchically multiplexing a plurality of low-speed channels (for example, telephone lines, etc.) into a channel and realizing a high-speed and large-capacity optical network. Multiplexing in SONET/SDH is accomplished by using a TDM system in which data is divided into packets according to fixed-length time-slots. The packets are grouped into a frame, and frames are transmitted sequentially. In this way, the bandwidth of each transmission channel on the optical network is divided and utilized.

Generalized Multi-Protocol Label Switching (GMPLS) has recently attracted attention as a technology for controlling transmission channels of the optical network that carry optical signals. GMPLS is Multi-Protocol Label Switching (MPLS), in which high-speed switching is realized by adding a label to an IP packet, generalized to extend the scope of applicability beyond IP networks to encompass TDM networks, optical wavelength multiplexed networks, etc. GMPLS simplifies traffic engineering, which involves control of routes and bandwidths of the optical communication channels (see, for example, "Generalized Multi-Protocol Label Switching (GMPLS) Extensions for Synchronous Optical Network (SONET) and Synchronous Digital Hierarchy (SDH) Control" by E. Mannie, and D. Papadimitriou, [online], December, 2005, retrieved from URL-http://www.i-etf.org/internet-drafts/draft-ietf-ccamp-rfc3946bis-01.txt, on Feb. 7, 2006).

How the optical communication channel (hereinafter, "path") is set up and released in the optical network using GMPLS is specifically explained next. An optical network employing the SONET/SDH system is presented as an example.

When setting up a path, a network administrator enters data such as optical transmission devices to be the start point and the end point of a path, and a required bandwidth into one optical transmission device from a network management system. Once the data is entered, each optical transmission device builds a physical topology table of the network using a protocol such as Open Shortest Path First-Traffic Engineering (OSPF-TE), and, based on the physical topology table, determines optical transmission devices to be passed through by the path and optical fibers to be used. Each optical transmission device then determines the bandwidth for the path after assessing whether the path and the required bandwidth are accepted in the optical transmission devices using a protocol such as Resource Reservation Protocol-Traffic Engineering (RSVP-TE).

The network administrator then enters a cross-connect command (such as ENT-CRS-STS3c) from the network management system, which initiates cross-connection (switching between the optical fibers) in each optical transmission devices. Thus, a path is set up in the optical network.

To release the path, the network administrator enters a release path command. Alternatively, an RSVP-TE protocol is implemented when a release path instruction is given based on the monitored port status.

Figure 12:
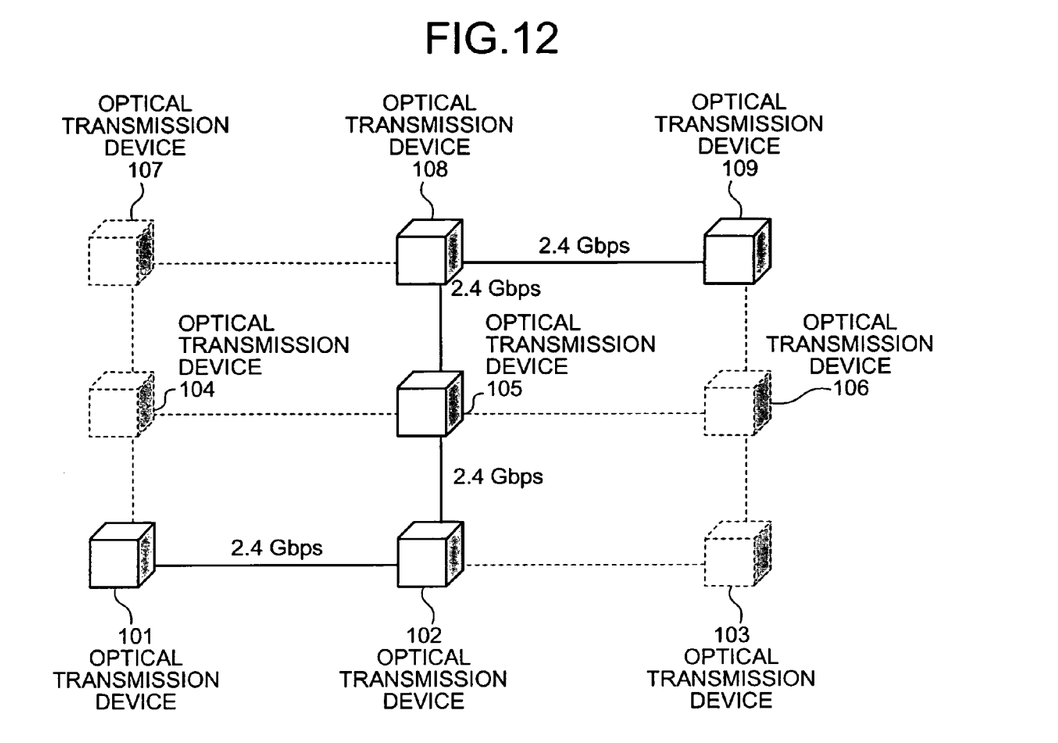
FIG. 12 is a schematic for explaining an optical network using GMPLS.

FIG. 12 is a schematic for explaining the optical network using GMPLS. In the optical network, optical transmission devices 101 to 109 are connected to one another through transmission channels (optical fibers). For setting up a path having a transmission rate of 155.52 Mbps, for example, Optical Carrier-Level 3 (OC-3 in SONET), from the optical transmission device 101 to the optical transmission device 109 of the optical network, the network administrator first specifies the optical transmission device 101 as the start point of the path and the optical transmission device 109 as the end point of the path.

It is assumed that each of the transmission channels (optical fibers) that connect the optical transmission devices 101 and 102, the optical transmission devices 102 and 105, the optical transmission devices 105 and 108, and the optical transmission devices 108 and 109 has a bandwidth of 2.4 Gbps. Because a bandwidth of 155.52 Mbps is ensured in all these transmission channels, a path is set up in the optical network starting from the optical transmission device 101 and ending at the optical transmission device 109 through the optical transmission devices 102, 105, and 108.

However, in the SONET/SDH system, the position of data of each path in a frame is indicated by a pointer set in a header portion of the frame. Consequently, it is not possible to divide up the data pertaining to the same path into a plurality of time slots that are not continuous in the frame. Therefore, repeated setup and release of paths in the optical network described above results in separation of the bandwidths of the transmission channels.

Figure 13:
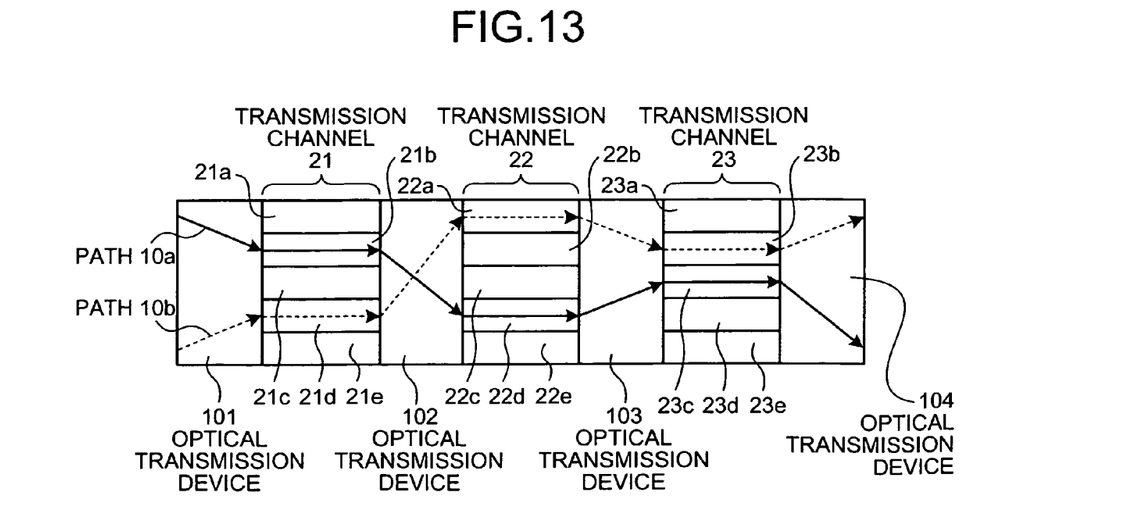
FIG. 13 is a schematic for explaining separation in transmission channels in the optical network using GMPLS.

FIG. 13 is a schematic for explaining separation in the transmission channels in the optical network using GMPLS. FIG. 13 depicts a status of part of transmission channels (having five continuous bandwidths) in the optical network after paths have been set up and released between the optical transmission devices 101 and 104. Specifically, FIG. 13 depicts bandwidths 21a to 21e separated from each other in a transmission channel 21, bandwidths 22a to 22e separated from each other in a transmission channel 22, and bandwidths 23a to 23e separated from each other in a transmission channel 23. Such separation occurs, for example, when five paths, including paths 10a and 10b, each having a transmission rate of 155.52 Mpbs are set up in the transmission channel 21, 22 and 23, and after that, paths using the bandwidths 21a, 21c, 21e, 22b, 22c, 22e, 23a, 23d, and 21e (i.e., paths other than the paths 10a and 10b) are released.

In the transmission channel 21, for example, a bandwidth of 466.56 Mbps (the sum of the bandwidths 21a, 21c, and 21e) remains unused. However, a path with a transmission rate of 466.56 Mpbs (such as OC-9 in SONET) cannot be set due to the bandwidths being non-continuous.

Thus, there is lack of flexibility in setting up paths due to separation of bandwidths in the transmission channels.

SUMMARY OF THE INVENTION

It is an object of the present invention to at least partially solve the problems in the conventional technology.

According to an aspect of the present invention, an optical transmission device that sets bandwidths of optical communication channels for inputting and outputting data in a time-division multiplexed optical network that uses Generalized Multi-Protocol Label Switching includes a switching unit that switches bandwidths used by optical communication channels in an optical transmission channel connecting to an adjoining optical transmission device, a detecting unit that detects non-continuous bandwidths in the optical transmission channel, and a bandwidth adjusting unit that controls the switching unit to rearrange detected non-continuous bandwidths into continuous bandwidths.

According to another aspect of the present invention, an optical transmission method for an optical transmission device to set bandwidths of optical communication channels for inputting and outputting data in a time-division multiplexed optical network that uses Generalized Multi-Protocol Label Switching includes detecting non-continuous bandwidths used by optical communication channels in an optical transmission channel, and rearranging the non-continuous bandwidths into continuous bandwidths.

According to still another aspect of the present invention, a computer-readable recording medium stores therein a computer program that implements the above method on a computer.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained next with reference to the accompanying drawings. The present invention is not limited to the embodiments described herein.

A concept of an optical transmission device according to the present embodiment is explained below.

Figure 1:
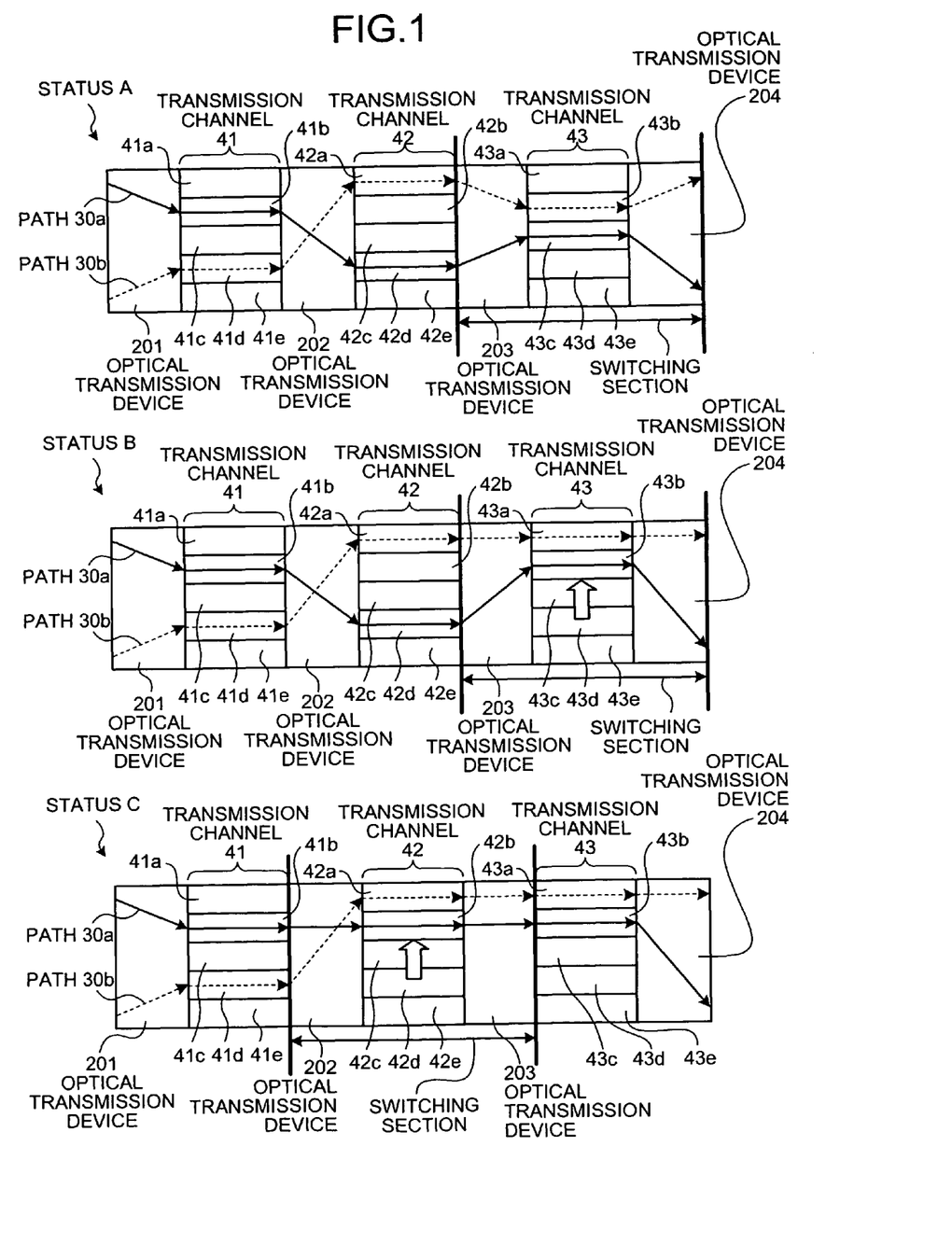
FIG. 1 is a schematic for explaining a concept of an optical transmission device according to an embodiment of the present invention.
Figure 2:
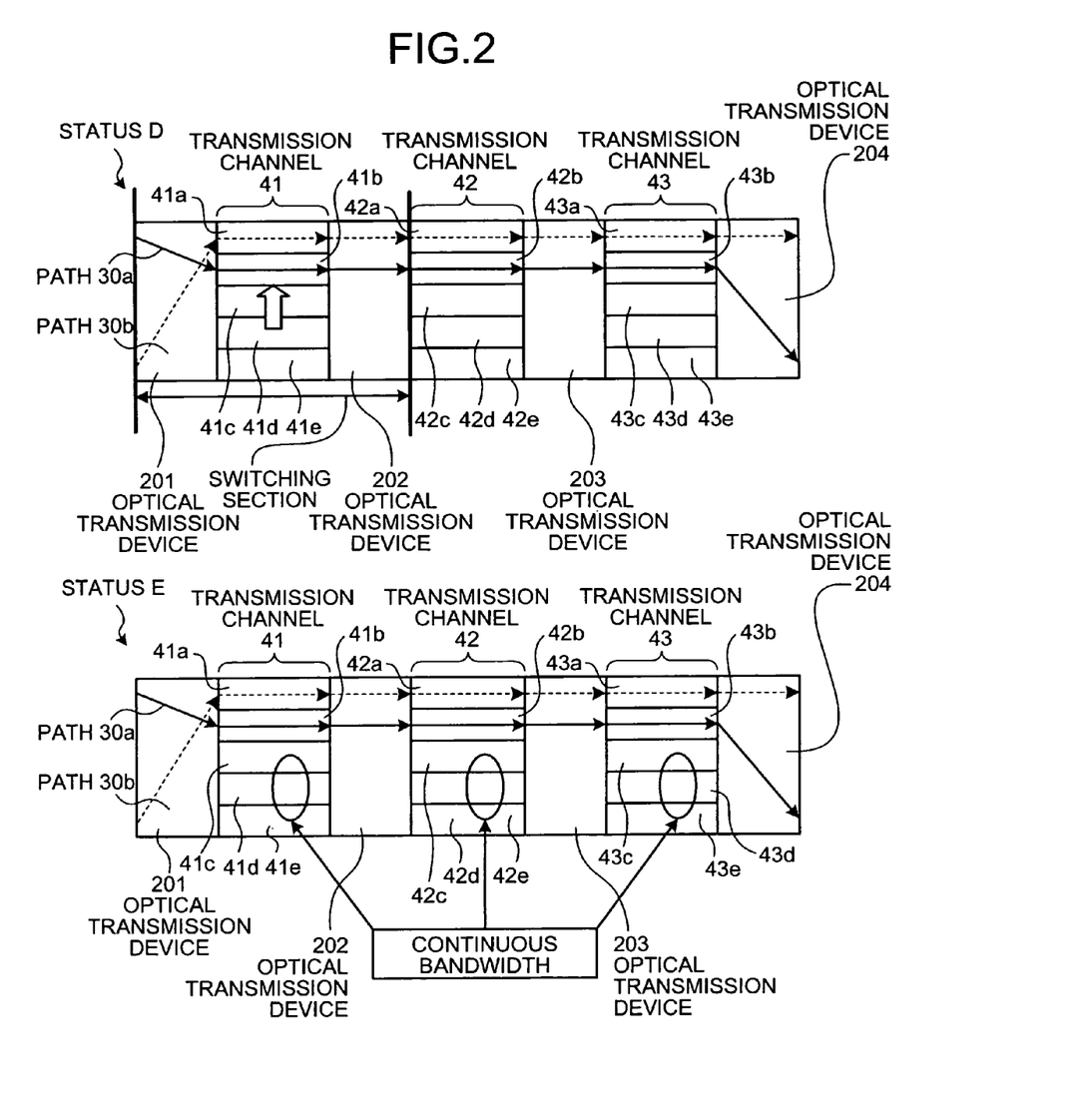
FIG. 2 is another schematic for explaining the concept of the optical transmission device.

FIGS. 1 and 2 are schematics for explaining the concept of the optical transmission device. FIGS. 1 and 2 depict a portion of a network that includes optical transmission devices 201, 202, 203, and 204 connected by optical fibers functioning as transmission channels.

The optical transmission devices 201 and 202 are connected to each other by a transmission channel 41, the optical transmission devices 202 and 203 are connected by a transmission channel 42, and the optical transmission devices 203 and 204 are connected by a transmission channel 43. The transmission channels 41 to 43 are each multiplexed into five bandwidths. Specifically, the transmission channel 41 includes bandwidths 41a to 41e, the transmission channel 42 includes bandwidths 42a to 42e, and the transmission channel 43 includes bandwidths 43a to 43e.

As shown in a status A of FIG. 1, two paths (optical communication channels) 30a and 30b are set up between the optical transmission devices 201 and 204 through the optical transmission devices 202 and 203. The bandwidth 41b of the transmission channel 41, the bandwidth 42d of the transmission channel 42, and the bandwidth 43c of the transmission channel 43 are allocated to the path 30a. The bandwidth 41d of the transmission channel 41, the bandwidth 42a of the transmission channel 42, and the bandwidth 43b of the transmission channel 43 are allocated to the path 30b.

In the status A of FIG. 1, separation occurs in the bandwidths of the transmission channels in the network because paths have been released. For example, in the transmission channel 41 where five paths have been allocated the bandwidths 41a, 41b, 41c, 41d, and 41e, respectively, separation of the bandwidths occurs due to release of the paths allocated the bandwidths 41a, 41c, and 41e.

To adjust the separation, each of the optical transmission devices 201 to 204 performs a bandwidth adjustment process by dynamically changing the route of a path passing therethrough and rearranging the non-continuous bandwidths allocated to paths into continuous ones.

Each of the optical transmission devices 201 to 204 first sends the adjoining optical transmission device its bandwidth usage data. Having received the bandwidth usage data, the adjoining optical transmission device stores the received bandwidth usage data of the previous optical transmission device, and sends the data to the next adjoining optical transmission device. Thus, each of the optical transmission devices on the network obtains the bandwidth usage data of all the other optical transmission devices on the network.

One of the optical transmission devices is selected by a predetermined method (for example, the optical transmission device with the smallest device number) to be a master optical transmission device. The master optical transmission device draws up a bandwidth adjustment schedule based on the bandwidth usage data stored therein. In the bandwidth adjustment schedule, the order in which the bandwidth adjustment process is to be carried out is specified for each transmission channel and each path.

Let us assume that the master optical transmission device has drawn up the bandwidth adjustment schedule to carry out the bandwidth adjustment process for the transmission channels 43, 42, and 41, and the paths 30b and 30a in this order. As shown in a status B of FIG. 1, the optical transmission device 203 that outputs data to the transmission channel 43 changes the bandwidth to output the data of the path 30b from the bandwidth 43b to 43a. The optical transmission device 204 that receives data from the transmission channel 43 changes the bandwidth to receive the data of the path 30b from the bandwidth 43b to 43a. Further, the optical transmission device 203 changes the bandwidth to output the data of the path 30a from the bandwidth 43c to 43b. The optical transmission device 204 changes the bandwidth to receive the data of the path 30a from the bandwidth 43c to 43b. Thus, the continuous bandwidths 43c to 43e can be secured in the transmission channel 43.

As shown in a status C of FIG. 1, the optical transmission device 202 that outputs data to the transmission channel 42 changes the bandwidth to output the data of the path 30a from the bandwidth 42d to 42b. The optical transmission device 203 that receives data from the transmission channel 42 changes the bandwidth to receive the data of the path 30a from the bandwidth 42d to 42b. Thus, the continuous bandwidths 42c to 42e can be secured in the transmission channel 42.

Further, as shown in a status D of FIG. 2, the optical transmission device 201 that outputs data to the transmission channel 41 changes the bandwidth to output the data of the path 30b from the bandwidth 41d to 41a. The optical transmission device 202 that receives data from the transmission channel 41 changes the bandwidth to receive the data of the path 30b from the bandwidth 41d to 41a. Thus, the continuous bandwidths 41c to 41e can be secured in the transmission channel 41.

As a result of the series of the bandwidth adjustments carried out as described above, continuous bandwidths can be achieved in the transmission channels 41, 42, and 43, as shown in a status E of FIG. 2.

Thus, if the bandwidths allocated to the paths in the transmission channel between two adjoining optical transmission devices are not continuous, the optical transmission devices rearrange the bandwidths into continuous ones, thereby eliminating any separation occurring in the bandwidths of the transmission channel and improving the flexibility in setting up paths on the optical network.

For convenience of description, the embodiment is explained by taking an example of an optical network that has four optical transmission devices. A plurality of optical transmission devices can be connected to the optical network. Also, in the above description, each transmission channel is divided into five bandwidths. The number of bandwidths is not limited to five, and can be set according to the bandwidth of the paths being set or the bandwidth of the optical fiber cable being used in the optical network.

Figure 3:
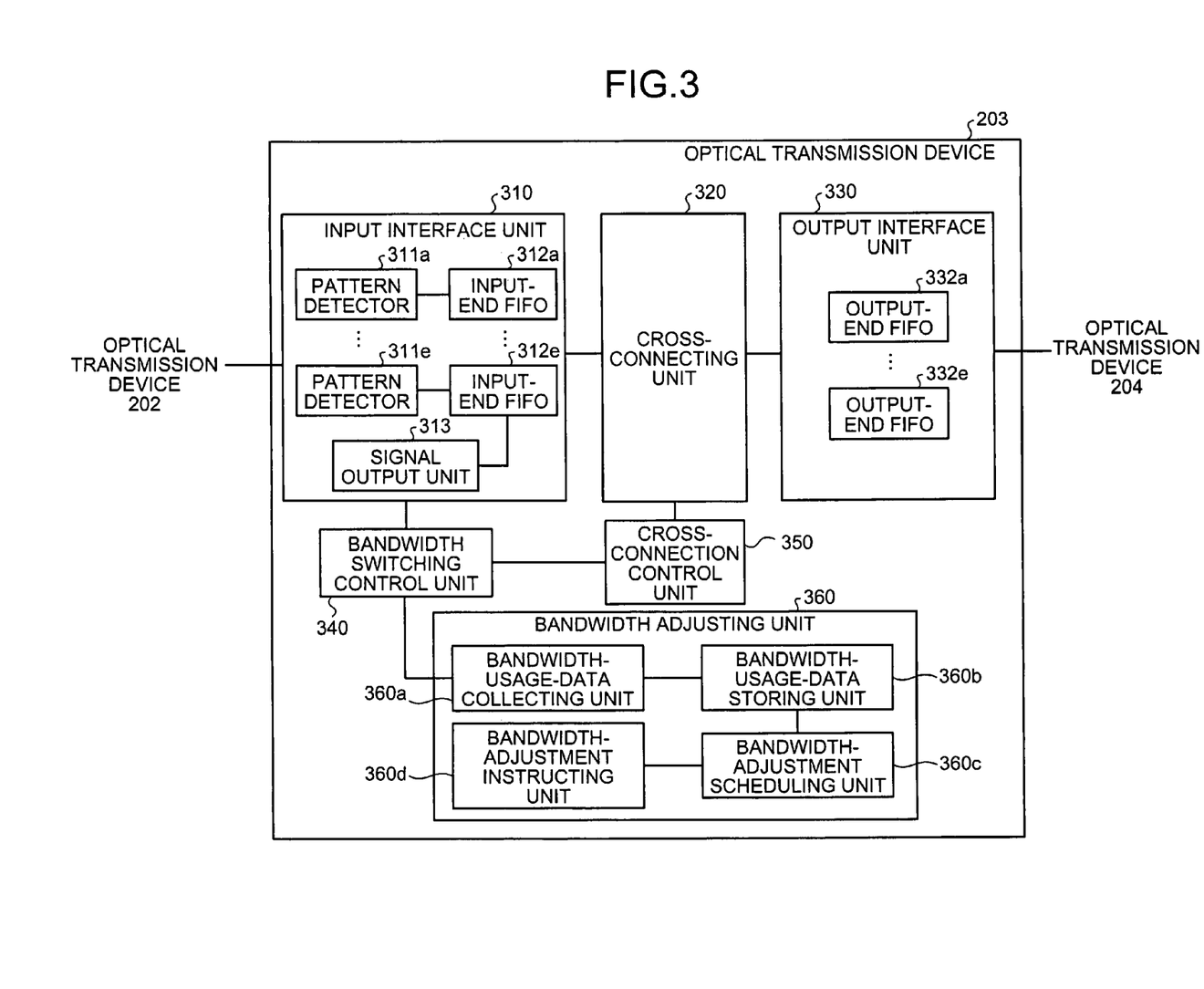
FIG. 3 is a detailed functional block diagram of the optical transmission device shown in FIG. 1.

FIG. 3 is a functional block diagram of the optical transmission device 203. The optical transmission device 203 includes an input interface unit 310, a cross-connecting unit 320, an output interface unit 330, a bandwidth switching control unit 340, a cross-connection control unit 350, and a bandwidth adjusting unit 360. The optical transmission devices 201, 202, and 204 all have a structure that is identical to that of the optical transmission device 203.

The input interface unit 310 reads data contained in a frame received from an adjoining optical transmission device with respect to each bandwidth, and outputs the data to the cross-connecting unit 320. The input interface unit 310 includes pattern detectors 311a to 311e, input-end First In First Out (FIFOs) 312a to 312e, and a signal output unit 313. The pattern detectors 311a to 311e detect control signals from the data read with respect to each bandwidth. The input-end FIFOs 312a to 312e store the data. The signal output unit 313 outputs the control signals to the input-end FIFOs 312a to 312e.

The pattern detectors 311a to 311e detect the control signals from the data the input interface unit 310 has read with respect to each bandwidth. The pattern detectors 311a to 311a correspond, respectively, to the bandwidths of the transmission channel on the input side. For example, in the optical transmission device 203 shown in FIG. 1, the pattern detector 311a corresponds to the bandwidth 42a, and the pattern detector 311e corresponds to the bandwidth 42e of the transmission channel 42.

The input-end FIFOs 312a to 312e are queues to store the data read by the input interface unit 310 with respect to each bandwidth. Each of the input-end FIFOs 312a to 312e has a length of at least v×t1, where v is a data transfer rate for the respective bandwidths, and t1 is a time required by the cross-connecting unit 320 to switch time-slots on the input side.

The input-end FIFOs 312a to 312e correspond, respectively, to the bandwidths of the transmission channel on the input side. For example, in the optical transmission device 203 shown in FIG. 1, the input-end FIFO 312a corresponds to the bandwidth 42a, and the input-end FIFO 312e corresponds to the bandwidth 42e of the transmission channel 42.

The input interface unit 310 in the embodiment is described as having five pattern detectors and five input-end FIFOs. However, it is possible to previously arrange the same number of pattern detectors and the input-end FIFOs as the maximum number of the bandwidths of the input-side transmission channel, and, according to need, the input-end FIFOs are associated with the bandwidths, respectively.

The signal output unit 313 outputs predetermined control signals to the input-end FIFOs 312a to 312e according to a Switch bandwidth instruction from the bandwidth switching control unit 340. The Switch bandwidth instruction from the bandwidth switching control unit 340 will be explained later.

The cross-connecting unit 320 is controlled by the cross-connection control unit 350, and switches connections between the input-end FIFOs 312a to 312e and output-end FIFOs 332a to 332e.

The output interface unit 330 sends the data output from the cross-connecting unit 320 with respect to each bandwidth to the adjoining optical transmission device. The output interface unit 330 includes the output-end FIFOs 332a to 332e that stores the data output from the cross-connecting unit 320.

The output-end FIFOs 332a to 332e are queues to store the data output from the cross-connecting unit 320 with respect to each bandwidth. Each of the output-end FIFOs 332a to 332e has a length of at least v×t2, where v is the data transfer rate for the respective bandwidths, and t2 is a time required by the cross-connecting unit 320 to switch time-slots on the output side.

The output-end FIFOs 332a to 332e correspond, respectively, to the bandwidths of the transmission channel on the output side. For example, in the optical transmission device 203 shown in FIG. 1, the output-end FIFO 332a corresponds to the bandwidth 43a, and the output-end FIFO 332e corresponds to the bandwidth 43e of the transmission channel 43.

The output interface unit 330 in the embodiment is described as having five output-end FIFOs. However, it is possible to previously arrange the same number of output-end FIFOs as the maximum number of the bandwidths of the output-side transmission channel, and, according to need, the output-end FIFOs are associated with the bandwidths, respectively.

The bandwidth switching control unit 340 controls the input interface unit 310 and the cross-connection control unit 350 based on the Switch bandwidth instruction from the bandwidth adjusting unit 360. Specifically, having received the Switch bandwidth instruction from the bandwidth adjusting unit 360, the bandwidth switching control unit 340 controls the signal output unit 313, and outputs a control signal to control the connection switch timing for the input-end FIFO corresponding to the bandwidth to be switched on the input side. The control of connection switch using two control signals e and s is explained.

The bandwidth switching control unit 340 constantly monitors read pointers of the input-end FIFOs 312a to 312e. When having determined that the control signal e is read from one of the input-end FIFOs 312a to 312e, the bandwidth switching control unit 340 controls the input interface unit 310 to stop reading data from the input-end FIFO, and instructs the cross-connection control unit 350 to switch the connection destination of the input-end FIFO to the output-end FIFO corresponding to the bandwidth to be switched on the output side.

Upon receiving a switch completion notification from the cross-connection control unit 350, the bandwidth switching control unit 340 controls the input interface unit 310 to restart reading of data from the input-end FIFO which has been terminated. Thus, the data stored in the input-end FIFO corresponding to the bandwidth to be switched on the input side is output to the output-end FIFO corresponding to the bandwidth to be switched on the output side.

Further, when the control signal e is received from the adjoining optical transmission device and one of the pattern detectors 311a to 311e notifies that the control signal e is detected, the bandwidth switching control unit 340 instructs the input interface unit 310 to stop writing data to the input-end FIFO associated with the bandwidth corresponding to the notifying pattern detector.

When the control signal s is received from the adjoining optical transmission device and one of the pattern detectors 311a to 311e notifies that the control signal s is detected, the bandwidth switching control unit 340 instructs the input interface unit 310 to start writing data to the input-end FIFO associated with the bandwidth corresponding to the notifying pattern detector.

The bandwidth switching control unit 340 constantly monitors write pointers of the output-end FIFOs 332a to 332e. When having determined that the control signal e is written to one of the output-end FIFOs 332a to 332e, the bandwidth switching control unit 340 issues a Switch input-end FIFO instruction to the cross-connection control unit 350. The Switch input-end FIFO instruction issued by the bandwidth switching control unit 340 switches the input-end FIFO associated with the bandwidth corresponding to the pattern detector that detected the control signal e to the input-end FIFO associated with the bandwidth corresponding to the pattern detector that detected the control signal s.

Upon receiving a switch completion notification from the cross-connection control unit 350, the bandwidth switching control unit 340 controls the input interface unit 310 to start reading of data from the input-end FIFO to which data writing has begun due to the detection of the control signal s. Thus, the data from the input-end FIFO corresponding to the bandwidth in which the control signal s was received is output to the bandwidth corresponding to the output-end FIFO to which the control signal e was written.

The control of connection switch is explained by presenting two control signals, namely control signals e and s. However, the control signals are not restricted to e and s. A pattern except patterns of data transmitted in the optical network can be defined as the pattern of the control signal.

The cross-connection control unit 350 controls the cross-connecting unit 320 based on a Switch connections instruction issued by the bandwidth switching control unit 340 or by the operation carried out by the network administrator or the like. Specifically, upon receiving a Switch input-end FIFO instruction or a Switch output-end FIFO instruction from the bandwidth switching control unit 340, the cross-connection control unit 350 controls the cross-connecting unit 320, and switches the connections of the input-end FIFO and the output-end FIFO based on the received instruction.

When the cross-connecting unit 320 is switching connections based on the instruction issued by the bandwidth switching control unit 340, the cross-connection control unit 350 does not accept the Switch connections instruction issued by the operation carried out by the network administrator or the like.

In other words, the cross-connection control unit 350 controls the Switch connections instructions issued by the bandwidth switching control unit 340 and by the operation carried out by the network administrator, etc. mutually exclusively, thereby preventing the cross-connecting unit 320 from setting up a faulty path.

The bandwidth adjusting unit 360 collects the device IDs and the bandwidth usage data of each optical transmission device in the optical network, draws up the bandwidth adjustment schedule, and controls the bandwidth adjustment based on the drawn up bandwidth adjustment schedule. The bandwidth adjusting unit 360 includes a bandwidth-usage-data collecting unit 360a, a bandwidth-usage-data storing unit 360b, a bandwidth-adjustment scheduling unit 360c, and a bandwidth-adjustment instructing unit 360d.

The bandwidth-usage-data collecting unit 360a collects the device IDs and bandwidth usage data of optical transmission devices in the optical network, and registers them in the bandwidth-usage-data storing unit 360b. Specifically, the bandwidth-usage-data collecting unit 360a first obtains the device ID and bandwidth usage data of its own optical transmission device. The bandwidth-usage-data collecting unit 360a then stores the data in the bandwidth-usage-data storing unit 360b as well as informing (sending) an adjoining optical transmission device of bandwidth adjustment data including the device ID and the bandwidth usage data obtained.

When the adjoining optical transmission device receives the bandwidth adjustment data, the bandwidth-usage-data collecting unit 360a thereof obtains the device ID and the bandwidth usage data of the previous optical transmission device from the received bandwidth adjustment data. The bandwidth-usage-data collecting unit 360a then stores the data in the bandwidth-usage-data storing unit 360b as well as informing (sending) a next adjoining optical transmission device of the bandwidth adjustment data.

Figure 4:
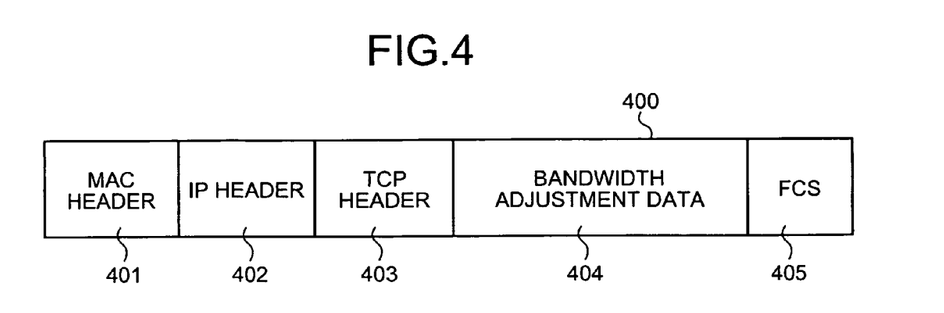
FIG. 4 is an example of packet data that includes therein bandwidth adjustment data.

FIG. 4 is an example of packet data that includes therein the bandwidth adjustment data. Bandwidth adjustment data 404 is set below a Transmission Control Protocol/Internet Protocol (TCP/IP) stack, and transmitted in the optical network. Packet data 400 includes a MAC header 401, an IP header 402, a TCP header 403, the bandwidth adjustment data 404, and a frame check sequence (FCS) 405.

In the example presented herein, the bandwidth adjustment data is set below the TCP/IP stack. The bandwidth adjustment data can be set in a predetermined layer of another protocol based on an Open System Interconnection (OSI) reference model.

Figure 5:
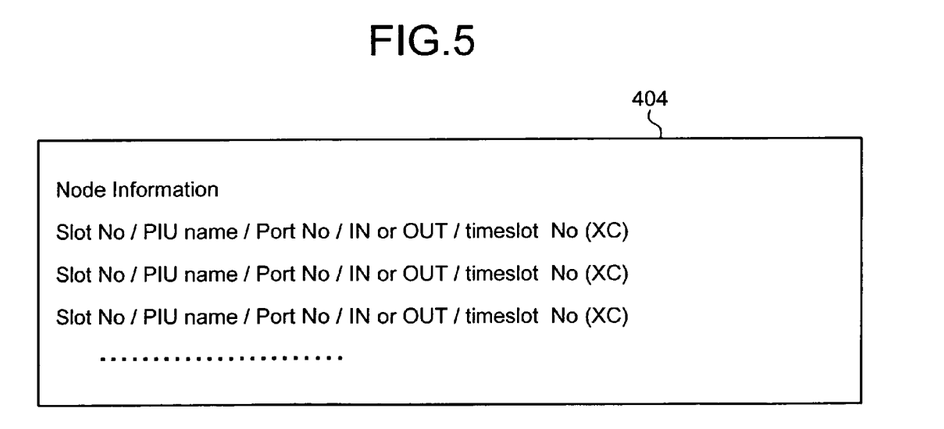
FIG. 5 is an example of the bandwidth adjustment data shown in FIG. 4.

FIG. 5 is an example of the bandwidth adjustment data 404. The bandwidth adjustment data 404 contains values indicating the status of use of the bandwidths for each optical transmission device separated by a slash. The parameters or values from left to right are Slot No. indicating a slot number to which an optical interface unit that connects to the optical fiber is connected, PIU name indicating the unit name of the optical interface unit, Port No. indicating the port number to which the optical fiber is connected, IN/OUT indicating whether the bandwidth is an input-side bandwidth or an output-side bandwidth, and timeslot No. indicating an ID that identifies the time-slot in a frame.

The bandwidth-usage-data storing unit 360b stores therein the device ID and the bandwidth usage data in an associated form for every optical transmission device in the optical network.

When in the master optical transmission device, the bandwidth-adjustment scheduling unit 360c draws up the bandwidth adjustment schedule based on the bandwidth usage data stored in the bandwidth-usage-data storing unit 360b. Specifically, the bandwidth-adjustment scheduling unit 360c determines by a predetermined method whether its own optical transmission device is the master one.

If it has been determined that the optical transmission device with the smallest device ID number is used as the master one, then the bandwidth-adjustment scheduling unit 360c refers to the device ID of each optical transmission device in the bandwidth-usage-data storing unit 360b. The bandwidth-adjustment scheduling unit 360c determines that its own optical transmission device is the master one if t the device ID number thereof is the smallest. The bandwidth-adjustment scheduling unit 360c then, based on the bandwidth usage data of each optical transmission device in the bandwidth-usage-data storing unit 360b, draws up the bandwidth adjustment schedule, which determines the order of the optical transmission devices and the paths in which the bandwidth adjustment is to be performed. The bandwidth-adjustment scheduling unit 360c notifies the other optical transmission devices of the bandwidth adjustment schedule, and sends an Adjust bandwidth instruction to the optical transmission device that is scheduled to perform the initial bandwidth adjustment.

The bandwidth-adjustment instructing unit 360d adjusts the bandwidth allocated to a path set in the optical transmission device by issuing an instruction to the bandwidth switching control unit 340 based on the bandwidth adjustment schedule drawn up by the bandwidth-adjustment scheduling unit 360c. Specifically, upon receiving the Adjust bandwidth instruction from the master optical transmission device or any other optical transmission device, the bandwidth-adjustment instructing unit 360d issues a Switch bandwidth instruction to the bandwidth switching control unit 340 for every path set in its own optical transmission device, in the order specified in the bandwidth adjustment schedule notified by the master optical transmission device. On this occasion, the bandwidth-adjustment instructing unit 360d informs the bandwidth switching control unit 340 of the input bandwidth of the path whose bandwidth is to be switched and the new output bandwidth which is to be allocated to the path.

Once bandwidth adjustment is completed for all the paths passing through its own optical transmission device, the bandwidth-adjustment instructing unit 360d determines whether its own optical transmission device is the last that performs the bandwidth adjustment in the bandwidth adjustment schedule notified by the master optical transmission device. If its own optical transmission device is the last that performs the bandwidth adjustment, the bandwidth-adjustment instructing unit 360d notifies the master optical transmission device of the completion of the bandwidth adjustment. Otherwise, the bandwidth-adjustment instructing unit 360d sends the Adjust bandwidth instruction to the optical transmission device that is scheduled to perform bandwidth adjustment next.

Thus, the bandwidth-usage-data collecting unit 360a informs the other optical transmission devices on the network of the bandwidth usage data including the data on the bandwidths used by the paths as well as collecting the bandwidth usage data sent by the other optical transmission devices. If its own optical transmission device is the master one, the bandwidth-adjustment scheduling unit 360c draws up the bandwidth adjustment schedule to be carried out by each optical transmission device on the optical network based on the bandwidth usage data collected by the bandwidth-usage-data collecting unit 360a. The bandwidth-adjustment instructing unit 360d rearranges the bandwidths based on the bandwidth adjustment schedule drawn up by the bandwidth-adjustment scheduling unit 360c. As a result, adjoining optical transmission devices with a transmission channel therebetween on the network can adjust their input or output bandwidth in the transmission channel in a synchronized manner. Thus, it is possible to improve the flexibility in setting up paths on the optical network.

Figure 6:
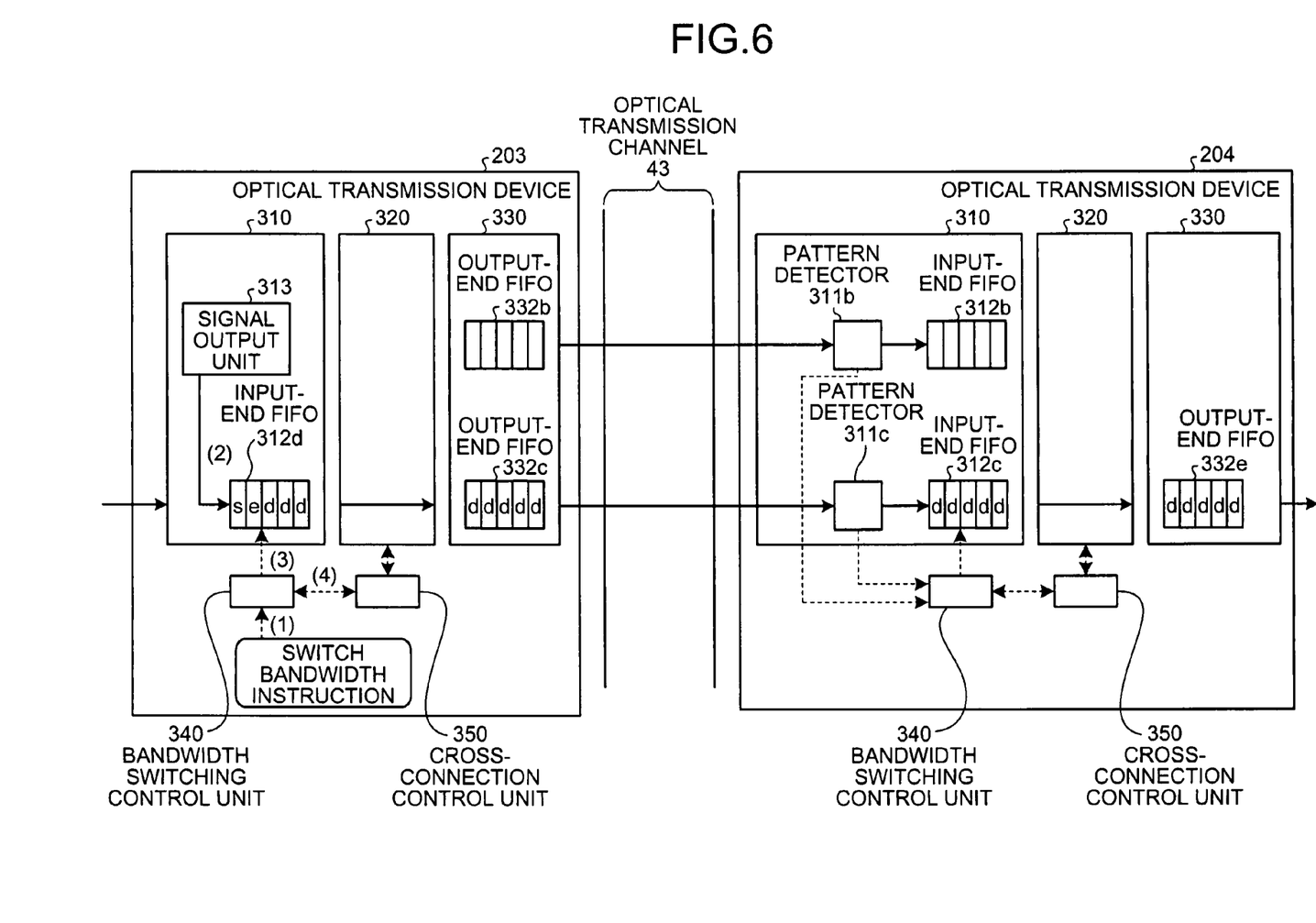
FIG. 6 is a schematic for explaining a bandwidth switching process performed by the optical transmission device.
Figure 7:
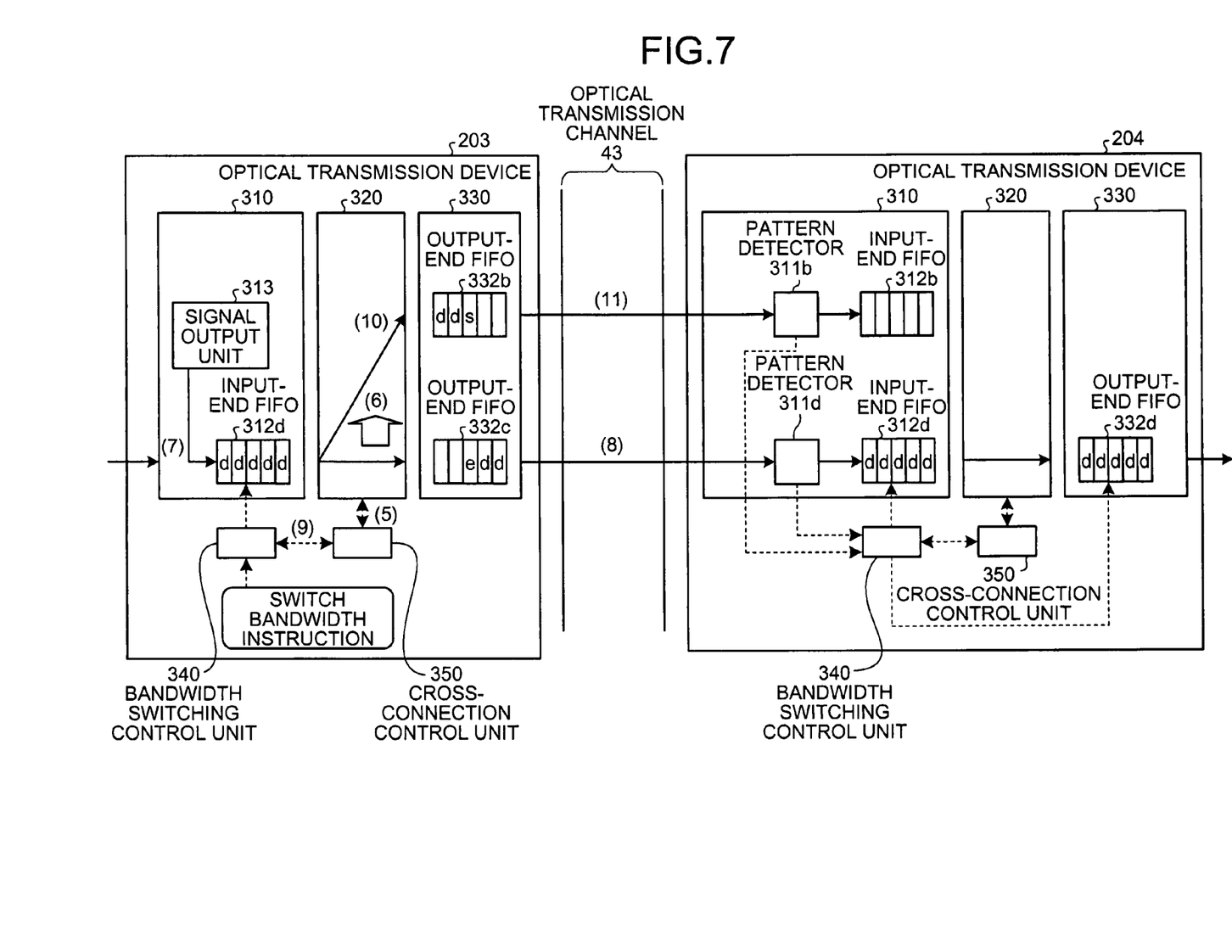
FIG. 7 is another schematic for explaining the bandwidth switching process.
Figure 8:
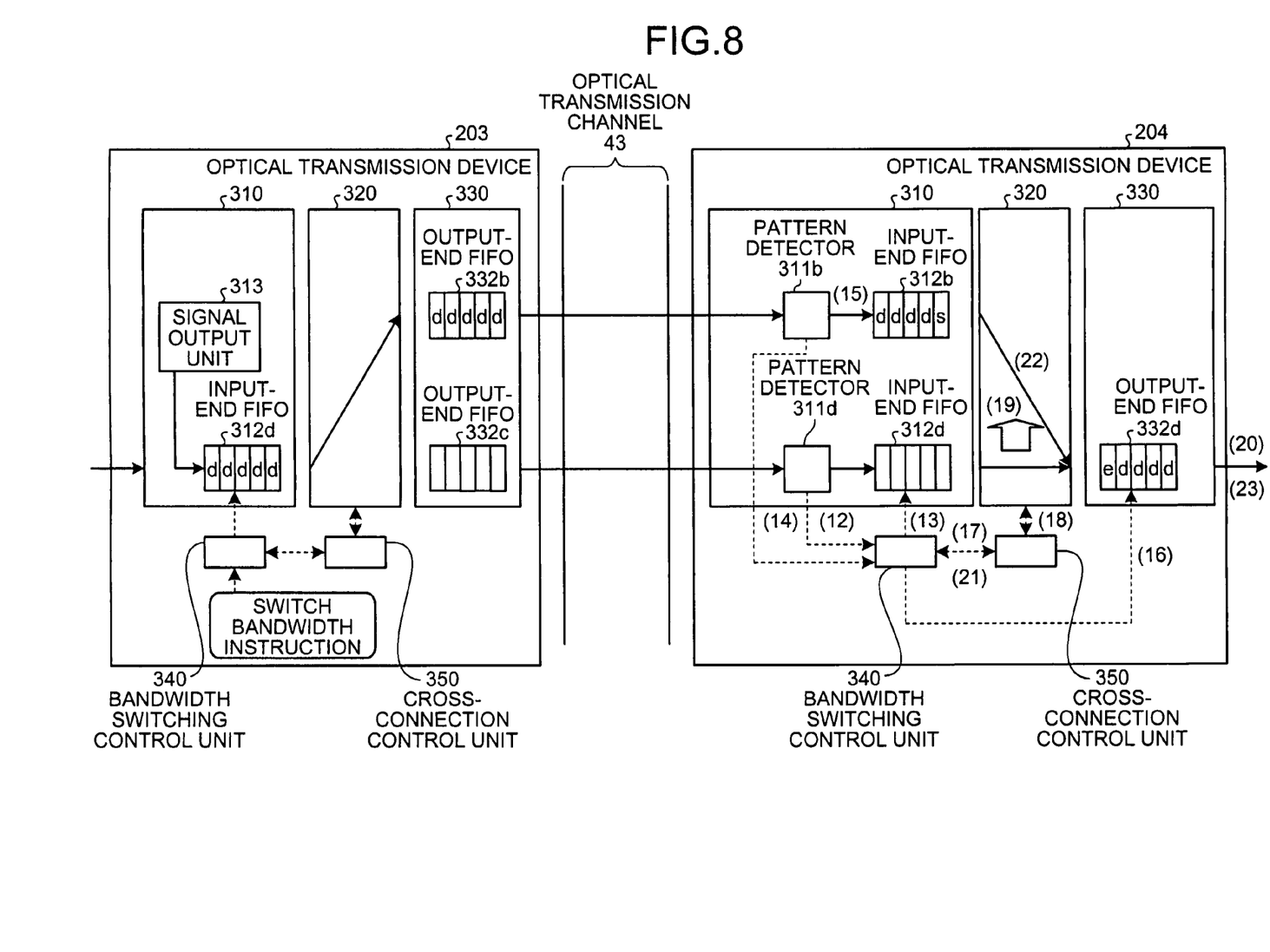
FIG. 8 is yet another schematic for explaining the bandwidth switching process.

FIGS. 6 to 8 are schematics for explaining the bandwidth switching process performed by the optical transmission devices 203 and 204. FIGS. 6 to 8 depict the bandwidth switching for the path 30a in a switching section shown in the status A and the status B of FIG. 1. The path 30a shown in the status A in FIG. 1 passes through the input-end FIFO 312d and the output-end FIFO 332c of the optical transmission device 203, and the pattern detector 311c, the input-end FIFO 312c and the output-end FIFO 332e of the optical transmission device 204. The functional parts of the optical transmission devices 203 and 204 that are not required in the bandwidth switching process are not shown in FIGS. 6 to 8.

The operation in the optical transmission device 203 is explained first with reference to FIGS. 6 and 7. As shown in FIG. 6, in the optical transmission device 203, when the bandwidth adjusting unit 360 issues a Switch bandwidth instruction to the bandwidth switching control unit 340 ((1) of FIG. 6), the bandwidth switching control unit 340 instructs the signal output unit 313 to output the control signals e and s sequentially to the input-end FIFO 312d ((2) of FIG. 6).

The bandwidth switching control unit 340 then monitors data read from the input-end FIFO 321d. When it is determined that the control signal e is read ((3) of FIG. 6), the bandwidth switching control unit 340 controls the input interface unit 310 to stop reading from the input-end FIFO 312d as well as sending a Switch connections instruction to the cross-connection control unit 350 ((4) of FIG. 6).

As shown in FIG. 7, the cross-connection control unit 350 controls the cross-connecting unit 320 based on the Switch connections instruction from the bandwidth switching control unit 340 ((5) of FIG. 7), and switches the connection destination of the input-end FIFO 312d from the output-end FIFO 332c to the output-end FIFO 332b ((6) of FIG. 7).

While the cross-connecting unit 320 is switching connections, the input-end FIFO 312d sequentially stores data sent from the adjoining optical transmission device ((7) of FIG. 7). The output-end FIFO 332c sequentially forwards data stored up to that point to the optical transmission device 204 ((8) of FIG. 7).

Upon completion of connection switching, the cross-connecting unit 320 issues a switch completion notification to the bandwidth switching control unit 340 through the cross-connection control unit 350 ((9) of FIG. 7). Upon receiving the switch completion notification, the bandwidth switching control unit 340 controls the input interface unit 310 to restart reading of data from the input-end FIFO 312d. The data read from the input-end FIFO 312d is sequentially output to the output-end FIFO 332b ((10) of FIG. 7), and further, is sequentially forwarded to the optical transmission device 204 ((11) of FIG. 7).

The operation in the optical transmission device 204 is explained next with reference to FIG. 8. In the optical transmission device 204, when the pattern detector 311d detects the control signal e ((12) of FIG. 8), the bandwidth switching control unit 340 controls the input interface unit 310 to stop output data to the input-end FIFO 312d ((13) OF FIG. 8).

When the pattern detector 311b detects the control signal s ((14) of FIG. 8), the bandwidth switching control unit 340 controls the input interface unit 310 to sequentially output data from the optical transmission device 203 to the input-end FIFO 312b ((15) of FIG. 8).

Upon determining that the control signal e is output to the output-end FIFO 332d ((16) of FIG. 8), the bandwidth switching control unit 340 issues a Switch connections instruction to the cross-connection control unit 350 ((17) of FIG. 8).

The cross-connection control unit 350 controls the cross-connecting unit 320 based on the Switch connections instruction from the bandwidth switching control unit 340 ((18) of FIG. 8), and switches the connection of the output-end FIFO 332 from the input-end FIFO 312d to the input-end FIFO 312b ((19) of FIG. 8).

While the cross-connecting unit 320 is switching connections, the output-end FIFO 332d sequentially forwards data stored up to that point to the adjoining optical transmission device ((20) of FIG. 8).

Upon completion of connection switching, the cross-connecting unit 320 issues a switch completion notification to the bandwidth switching control unit 340 through the cross-connection control unit 350 ((21) of FIG. 8). Upon receiving the switch completion notification, the bandwidth switching control unit 340 controls the input interface unit 310 to restarts reading of data from the input-end FIFO 312b. The data read from the input-end FIFO 312b is sequentially output to the output-end FIFO 332b ((22) of FIG. 8), and further, is sequentially forwarded to the adjoining optical transmission device ((23) of FIG. 8).

Thus, in the transmitting optical transmission device, while the cross-connecting unit 320 is switching connections, the input-end FIFO 312d sequentially stores data sent from the previous adjoining optical transmission device, and the output-end FIFO 332c sequentially sends stored data to the next adjoining optical transmission device. In the receiving optical transmission device, while the cross-connecting unit 320 is switching connections, the input-end FIFO 312b sequentially stores the data sent from the transmitting optical transmission device, and the output-end FIFO 332d sequentially forwards stored data to the next adjoining optical transmission device. As a result, the data transmission in the paths can be carried out without interruption even while the bandwidths allocated to the paths are being switched.

Further, by sending the adjoining optical transmission device a control signal for controlling the switching timing of bandwidths, adjoining optical transmission devices with a transmission channel therebetween can switch bandwidths in a synchronized manner. As a result, any separation of bandwidths occurring in the transmission channel connecting the adjoining optical transmission devices can be effectively eliminated.

Figure 9:
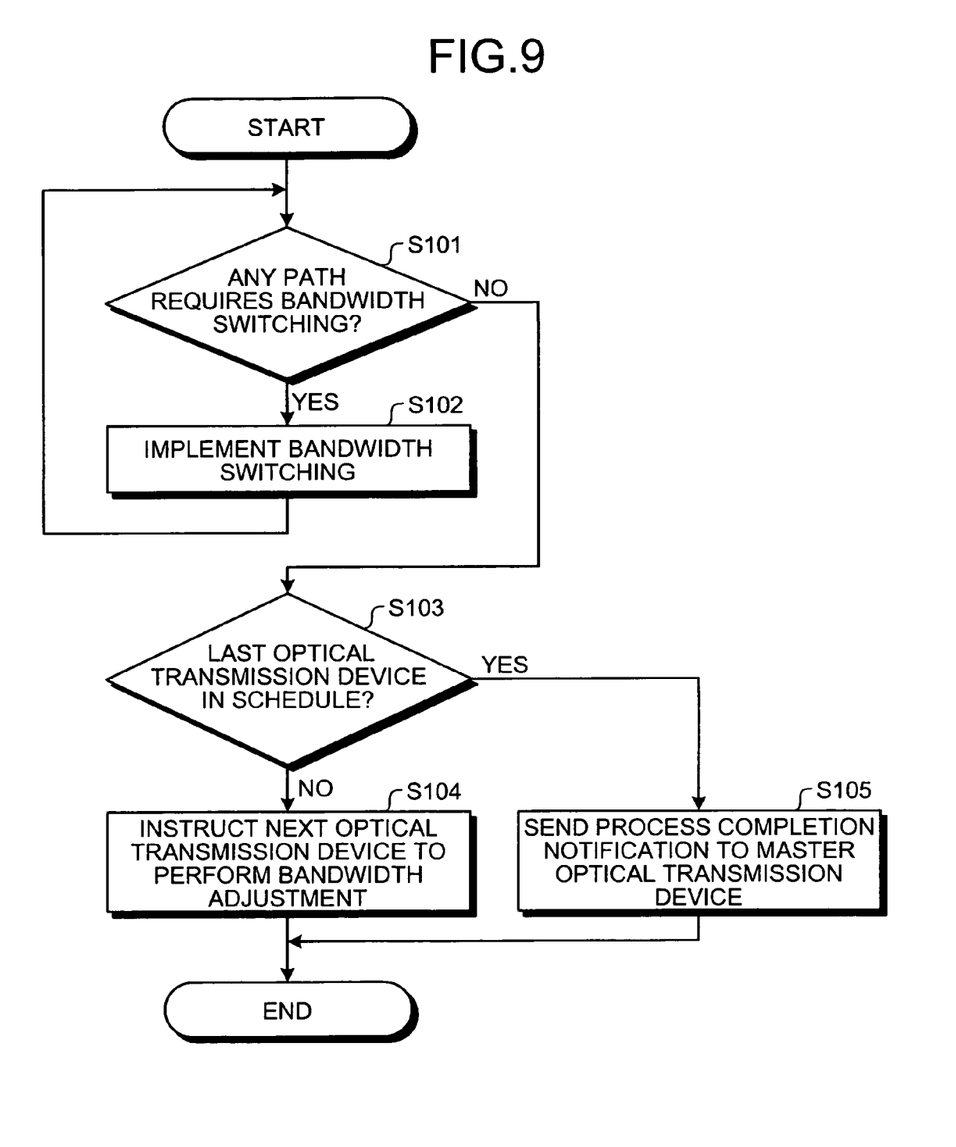
FIG. 9 is a flowchart of the bandwidth switching process performed by the optical transmission device.

FIG. 9 is a flowchart of the bandwidth switching process performed by the optical transmission device 203.

When the optical transmission device 203 receives an Adjust bandwidth instruction from the master optical transmission device or any other optical transmission device, the bandwidth-adjustment instructing unit 360d checks if any path requires bandwidth switching (step S101). When there is a path that requires bandwidth switching (Yes at step S101), the bandwidth-adjustment instructing unit 360d instructs the bandwidth switching control unit 340 to implement bandwidth switching for the path (step S102).

Upon completion of bandwidth switching for all the paths that require bandwidth switching (No at step S101), the bandwidth-adjustment instructing unit 360d determines whether its own optical transmission device is the last that performs the bandwidth adjustment in the bandwidth adjustment schedule drawn up by the bandwidth-adjustment scheduling unit 360c (step S103).

If it is determined that its own optical transmission device is not the last one in the bandwidth adjustment schedule (No at step S103), the bandwidth-adjustment instructing unit 360d sends an instruction to the next adjoining optical transmission device to perform the bandwidth adjustment process (step S104). If its own optical transmission device is the last one in the bandwidth adjustment schedule (Yes at step S103), the bandwidth-adjustment instructing unit 360d notifies the master optical transmission device of the completion of the bandwidth adjustment process (step S105).

Thus, bandwidth adjustment is performed by the bandwidth-adjustment instructing unit 360d issuing an instruction to the bandwidth switching control unit 340 based on the bandwidth adjustment schedule drawn up by the master optical transmission device. As a result, respective adjoining optical transmission devices on the optical network can perform bandwidth adjustment in a synchronized manner, which improves flexibility in setting up paths in the optical network.

In the embodiment, input and output take place to and from a single optical transmission device. The present invention is not so limited but can be similarly applied to situations where a single optical transmission device receives inputs from or outputs data to a plurality of optical transmission devices.

Figure 10:
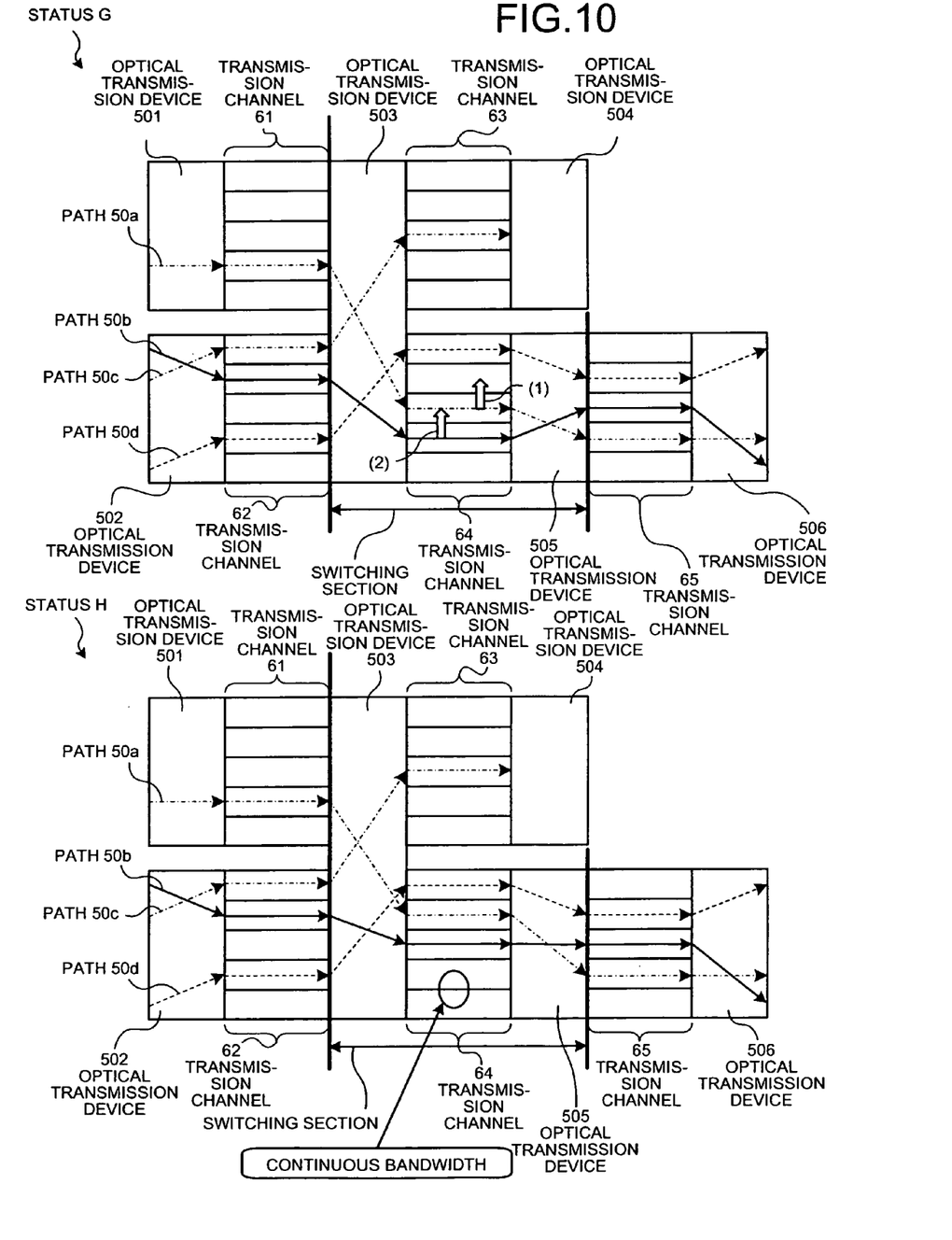
FIG. 10 is a schematic for explaining a bandwidth adjustment process in an instance where there are inputs from and outputs to a plurality of optical transmission devices.

FIG. 10 is a schematic for explaining the bandwidth adjustment process in the instance where there are inputs from and outputs to a plurality of optical transmission devices. FIG. 10 depicts part of an optical network in which optical fibers are used for transmission channels to connect optical transmission devices 501, 502, 503, 504, 505 and 506. Specifically, the optical transmission devices 501 and 503 are connected through a transmission channel 61, the optical transmission devices 502 and 503 are connected through a transmission channel 62, the optical transmission devices 503 and 504 are connected through a transmission channel 63, the optical transmission devices 503 and 505 are connected through a transmission channel 64, and the optical transmission devices 505 and 506 are connected through a transmission channel 65. Each of the transmission channels 61 to 65 is multiplexed into five bandwidths.

In a status G of FIG. 10, a path 50a is set between the optical transmission devices 501 and 506 through the optical transmission devices 503 and 505. Paths 50b and 50d are set between the optical transmission devices 502 and 506 through the optical transmission devices 503 and 505. In addition, a path 50c is set between the optical transmission devices 502 and 504 through the optical transmission device 503. In the status G, separation occurs between the paths 50a and 50d. Accordingly, the optical transmission devices 503 and 505 first rearrange bandwidth allocated to the path 50a so that the bandwidth becomes continuous with bandwidth allocated to the path 50d ((1) of FIG. 10). Then, the optical transmission devices 503 and 505 rearrange bandwidth allocated to the path 50b so that the bandwidth becomes continuous with the bandwidths allocated to the path 50d ((2) of FIG. 10). Thus, as shown in a status H of FIG. 10, continuous bandwidths can be secured in the transmission channel 64.

Thus, even when one optical transmission device receives inputs from a plurality of optical transmission devices and one optical transmission device outputs data to a plurality of optical transmission devices, if a switching section is set for every transmission channel, the bandwidths of paths passing through the switching section can be switched sequentially.

Thus, in the embodiment, the input interface unit 310, the cross-connecting unit 320, and the output interface unit 330 switch bandwidths allocated to paths in a transmission channel that connects adjoining optical transmission devices. The switching of the bandwidths is performed synchronously with the adjoining optical transmission device. If bandwidths allocated to paths in the transmission channel are not continuous, the bandwidth switching control unit 340 controls the input interface unit 310, the cross-connecting unit 320, and the output interface unit 330 to rearrange the non-continuous bandwidths into continuous ones. Thus, any separation occurring in the transmission channel is eliminated, and the flexibility in setting up paths in the optical network can be improved.

The optical transmission device is explained above as hardware; however, it can be implemented in software. In other words, a computer program (hereinafter, "optical transmission control program") can be executed on a computer to realize the same functions as the optical transmission device. Such a computer is described next.

Figure 11:
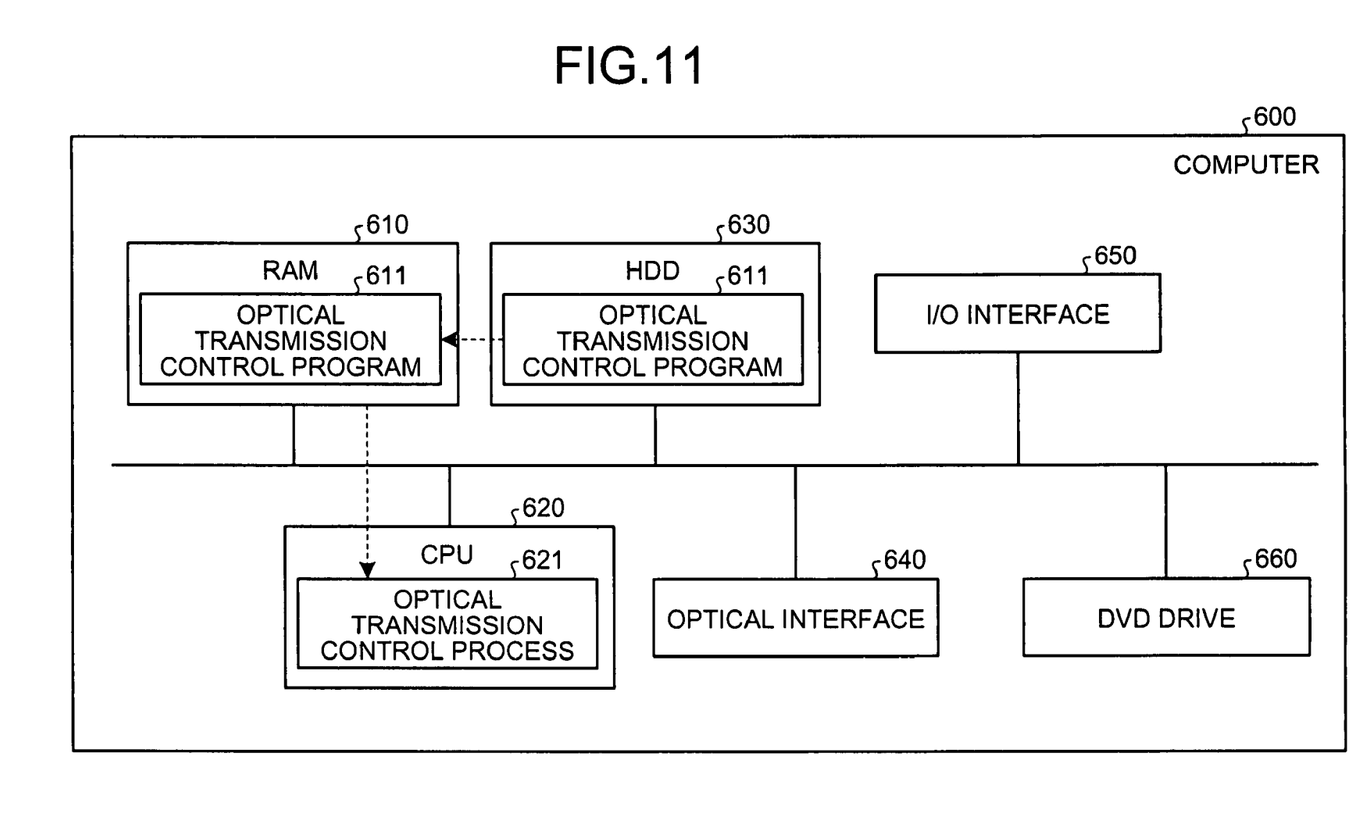
FIG. 11 is a block diagram of a computer that executes an optical transmission control program according to the present embodiment.

FIG. 11 is a block diagram of the computer that executes the optical transmission control program. A computer 600 includes a random access memory (RAM) 610, a central processing unit (CPU) 620, a hard disk drive (HDD) 630, an optical interface 640, an input/output (I/O) interface 650, and a digital versatile disk (DVD) drive 660.

The RAM 610 is a memory that stores therein a program or intermediate results of the program when it is being executed. The CPU 620 reads the program from the RAM 610 and executes it.

The HDD 630 is a disk device that stores thereon various programs and data. The optical interface 640 connects the computer 600 with other computers via a network.

The I/O interface 650 is an interface by which an input device such as a mouse, keyboard, etc., and a display device are connected to the computer 600. The DVD drive 660 reads data from and writes data to a DVD.

An optical transmission control program 611 executed by the computer 600 is stored on a DVD. The optical transmission control program 611 in the DVD is read by the DVD drive 660, and installed on the computer 600.

Alternatively, the optical transmission control program 611, which is stored in a database, etc. of another computer system connected to the computer 600 via the optical interface 640, can be read from the database and installed on the computer 600.

The installed optical transmission control program 611 is stored in the HDD 630, loaded into the RAM 610, and executed as an optical transmission control process 621 by the CPU 620.

As set forth hereinabove, according to an embodiment of the present invention, non-continuous bandwidths of transmission channels are rearranged into continuous ones between respective adjoining optical transmission devices with respect to each transmission channel. Such bandwidth adjustment is performed in a synchronized manner in the adjoining optical transmission devices on an optical network. Consequently, separation of bandwidths that occurs in transmission channels can be eliminated, and flexibility in setting up paths in the entire optical network can be improved. Moreover, the switching of bandwidths allocated to transmission channels can be carried out without interrupting the transmission of data performed therein.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical transmission device that sets bandwidths of optical communication channels for inputting and outputting data in a time-division multiplexed optical network that uses Generalized Multi-Protocol Label Switching, the optical transmission device comprising:
   a switching unit that switches bandwidths used by the optical communication channels in an optical transmission channel connecting to an adjoining optical transmission device, each of the bandwidths corresponding to a time slot in the time-division multiplexed optical network;
   a detecting unit that detects a non-continuous bandwidth used by at least one of the optical communication channels in the optical transmission channel, the non-continuous bandwidth indicating a bandwidth between two of the bandwidths that are not used as an optical communication channel; and
   a bandwidth adjusting unit that controls the switching unit to rearrange the detected non-continuous bandwidth into a continuous bandwidth for the optical communication channels.

2. The optical transmission device according to claim 1, further comprising:
   a bandwidth-usage-data collecting unit that informs another optical transmission device on the optical network of bandwidth usage data including data on bandwidths used by optical communication channels, and collects bandwidth usage data informed by another optical transmission device; and
   a bandwidth-adjustment scheduling unit that, when the optical transmission device is selected as a master optical transmission device, determines a bandwidth adjustment schedule to be performed by respective optical transmission devices on the optical network based on the bandwidth usage data collected by the bandwidth-usage-data collecting unit,
   wherein bandwidth adjusting units of the respective optical transmission devices rearrange non-continuous bandwidths with respect to each optical transmission channel based on the bandwidth adjustment schedule determined by the bandwidth-adjustment scheduling unit.

3. The optical transmission device according to claim 1, further comprising:
   an input-end queue that stores data received in an input bandwidth; and
   an output-end queue that stores data to be transmitted in an output bandwidth,
   wherein data is stored in the input-end queue and data stored in the output-end queue is transmitted while connection between the input-end queue and the output-end queue is switched by the switching unit.

4. The optical transmission device according to claim 1, wherein the switching unit transmits to the adjoining optical transmission device a control signal for controlling timing of switching the bandwidths to switch the bandwidths synchronously with the adjoining optical transmission device.

5. The optical transmission device according to claim 1, wherein the switching unit controls switching of the bandwidths based on either of control by the bandwidth adjusting unit or an operation by a network administrator.

6. An optical transmission method for an optical transmission device to set bandwidths of optical communication channels for inputting and outputting data in a time-division multiplexed optical network that uses Generalized Multi-Protocol Label Switching, each of the bandwidths corresponding to a time slot in the time-division multiplexed optical network, the optical transmission method comprising:

detecting a non-continuous bandwidth used by at least one of the optical communication channels in an optical transmission channel, the non-continuous bandwidth indicating a bandwidth between two of the bandwidths that are not used as an optical communication channel; and     rearranging the detected non-continuous bandwidth into a continuous bandwidth for the optical communication channels.

7. The optical transmission method according to claim 6, further comprising:

informing another optical transmission device on the optical network of bandwidth usage data including data on bandwidths used by optical communication channels, and collecting bandwidth usage data informed by another optical transmission device; and     determining, in a master optical transmission device, a bandwidth adjustment schedule to be performed by respective optical transmission devices on the optical network based on collected bandwidth usage data,     wherein the respective optical transmission devices rearrange non-continuous bandwidths with respect to each optical transmission channel based on determined bandwidth adjustment schedule.

8. A computer-readable recording medium that stores therein a computer program for controlling a computer to set bandwidths of optical communication channels for inputting and outputting data in a time-division multiplexed optical network using Generalized Multi-Protocol Label Switching, each of the bandwidths corresponding to a time slot in the time-division multiplexed optical network, the computer program causing the computer to execute:

detecting a non-continuous bandwidth used by at least one of the optical communication channels in an optical transmission channel, the non-continuous bandwidth indicating a bandwidth between two of the bandwidths that are not used as an optical communication channel; and     rearranging the detected non-continuous bandwidth into a continuous bandwidth for the optical communication channels.

9. The computer-readable recording medium according to claim 8, wherein the computer program further causing the computer to execute:

informing another computer on the optical network of bandwidth usage data including data on bandwidths used by optical communication channels, and collecting bandwidth usage data informed by another computer; and     determining, in a master computer, a bandwidth adjustment schedule to be performed by respective computers on the optical network based on collected bandwidth usage data,     wherein the respective computers rearrange non-continuous bandwidths with respect to each optical transmission channel based on determined bandwidth adjustment schedule.

* * * * *